(12) United States Patent
Paulos et al.

(10) Patent No.: US 7,200,176 B1
(45) Date of Patent: Apr. 3, 2007

(54) TRANSFORMERLESS ETHERNET CONTROLLER

(75) Inventors: John Paulos, Austin, TX (US); Nicholas van Bavel, Austin, TX (US)

(73) Assignee: Vitesse Semiconductor Corporation, Camarillo, CA (US)

( * ) Notice: Subject to any disclaimer, the term of this patent is extended or adjusted under 35 U.S.C. 154(b) by 659 days.

(21) Appl. No.: 10/189,619

(22) Filed: Jul. 3, 2002

Related U.S. Application Data (60) Provisional application No. 60/303,708, filed on Jul. 6, 2001.

(51) Int. Cl.
*H04B 3/00* (2006.01)

(52) U.S. Cl. ............... 375/257; 375/220; 375/222; 333/181; 333/24 R; 307/128

(58) Field of Classification Search .......... 375/219, 375/220, 222, 286, 288, 256, 257, 258; 333/24 R, 333/124, 126, 129, 132, 1, 117, 120, 125, 333/131, 24.2, 167, 181, 24 C; 370/293, 370/463; 307/26, 128, 11, 18, 25, 112, 116, 307/125; 340/310.11
See application file for complete search history.

(56) References Cited

U.S. PATENT DOCUMENTS

| | | | | |
|---|---|---|---|---|
| 5,454,008 A | * | 9/1995 | Baumann et al. | ........... 375/369 |
| 5,655,010 A | * | 8/1997 | Bingel | ............... 379/93.28 |
| 5,747,893 A | * | 5/1998 | Bennett et al. | ........... 307/100 |
| 6,259,745 B1 | * | 7/2001 | Chan | ........... 375/285 |
| 6,658,051 B1 | * | 12/2003 | Liu | ........... 375/222 |
| 6,714,558 B1 | * | 3/2004 | Patel et al. | ........... 370/445 |
| 6,751,315 B1 | * | 6/2004 | Liu et al. | ............... 379/413.02 |

* cited by examiner

*Primary Examiner*—Pankaj Kumar
*Assistant Examiner*—Naheed Ejaz
(74) *Attorney, Agent, or Firm*—Christie, Parker & Hale, LLP (57) ABSTRACT

Transformerless ethernet controller. A method for isolating an ethernet controller, having a transceiver associated therewith, from a twisted wire transmission line is provided. The power supply of the transceiver is DC isolated from system power supply. The data side of the ethernet controller is DC isolated from the transceiver for both transmit and receive data. The transceiver is directly connected to the transmission line with no DC isolation.

20 Claims, 6 Drawing Sheets

TRANSFORMERLESS ETHERNET CONTROLLER

CROSS REFERENCE TO RELATED APPLICATIONS

This application claims priority to U.S. Provisional Patent Application Ser. No. 60/303,708, filed Jul. 6, 2001 and entitled "TRANSFORMERLESS ETHERNET CONTROLLER."

TECHNICAL FIELD OF THE INVENTION

The present invention pertains in general to an ethernet controller and, more particularly, to an ethernet controller that interfaces with a transmission medium without the use of transformers while maintaining DC isolation from the transmission medium.

BACKGROUND OF THE INVENTION

Ethernet controllers are provided to facilitate data communication over a network in accordance with a defined transport protocol. The ethernet controllers are typically included in a network interface card (NIC) which interfaces through a port on a PC or similar device to a transmission medium. This transmission medium could be a fiber optic medium, a coaxial cable medium or a twisted wire pair medium. Each of these mediums requires a corresponding transceiver to interface the data thereto. The transmission medium will then provide a connection to another NIC on the system, typically at a hub. This constitutes the other end of the connection, such that a dedicated connection will be provided between two NIC cards.

For the twisted wire pair interface, a transformer is typically utilized on both the transmit side and the receive side to effectively isolate the transceiver from the transmission line itself. The purpose for this is to ensure that a defined DC voltage is present at each end of the transmission line and also to ensure that any high voltages present on the transmission line, due to static electricity and the such, are not coupled through to the input of the transceiver, which is typically in an integrated circuit. The specifications for this protection, i.e., referred to as an isolation barrier, requires that it withstand 2,000 volts. However, the transformers can become rather complex and constitute a substantive portion of the cost of a NIC. With the present high speed ethernet controllers, such as the 1000BASE-T ethernet controllers, the complexity of the transformers is due, in part, to the fact that they require hand wound transformers. Further, for restricted form factors, the size of the transformer can be an impediment.

SUMMARY OF THE INVENTION

The present invention disclosed and claimed herein, in one aspect thereof, comprises a method for isolating an ethernet controller, having a transceiver associated therewith, from a twisted wire transmission line. The power supply of the transceiver is DC isolated from system power supply. The data side of the ethernet controller is DC isolated from the transceiver for both transmit and receive data The transceiver is directly connected to the transmission line with no DC isolation.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
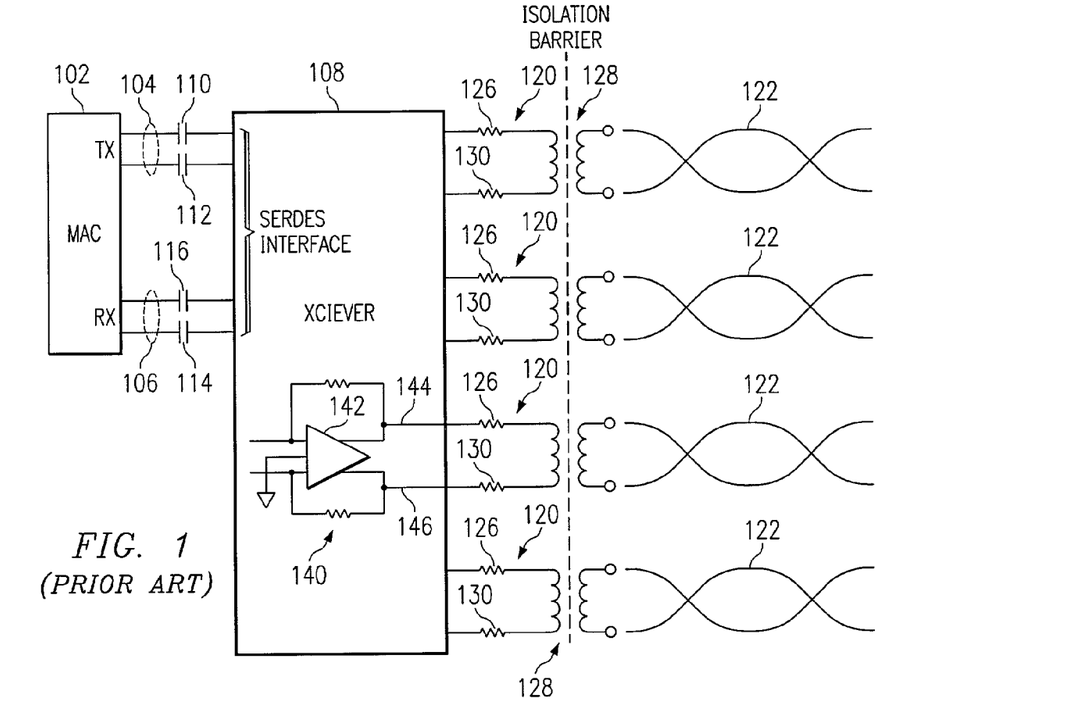
FIG. 1 illustrates a diagrammatic view of a prior art interconnection scheme for an ethernet controller.

Referring now to FIG. 1, there is illustrated a diagrammatic view for a prior art system that utilizes transformer isolation in an ethernet controller. In the embodiment of FIG. 1, there is illustrated a 1000BASE-T example wherein four ports of a twisted wire pair are utilized. In the 1000BASE-T mode, full duplex operation is facilitated wherein all four ports, one pair of wires per port, are utilized for the transmit/receive operation. Each port operates in a full duplex mode to transmit/receive at 250 Mbits/sec. The 1000BASE-T configuration for the ethernet controller is comprised of a media access controller (MAC) 102 which operates in accordance with a serializer/deserializer (SERDES) format which requires two wires 104 for the transmit operation and two wires 106 for the receive operation. The transmit operation is one where data is transmitted from the MAC 102 and the receive operation is where data is received at the MAC 102. The two transmit wires 104 are interfaced with a transceiver 108 through two capacitors 110 and 112 associated with the two wires 104. This provides capacitive coupling. Similarly, the receive wires 106 are interfaced with the transceiver 108 through two capacitors 114 and 116, respectively, one for each of the two receive wires 106. The transmit and receive lines are operable to couple both clock and data, wherein receive data is operable to extract the clock and then use the extracted clock to slice the receive signal and retrieve the data therefrom.

There are provided four ports 120 on the media interface side of the transceiver 108 interfaced with twisted wire pair transmission lines 122. Since each constitutes a pair, the four twisted pair transmission lines comprise one "bundle" which is connected to an RJ45 connector. The operation of this is described in the IEEE 802.3 Ethernet Protocol Standard.

Each of the ports 120 has two terminals associated therewith, one connected through a resistor 126 to one side of a transformer 128 and the other terminal of the transceiver 106 connected through a resistor 130 to the other side of the transformer on the transceiver side. The transmission medium side of the transformer is also comprised of two terminals, each of which is connected to one of the two wires in the associated twisted wire pair. Illustrated in the transceiver is a line driver 140 which is comprised of a differential driver 142 having a common mode voltage and two differential outputs 144 and 146. The differential voltage driver provides a lower common mode noise for the overall driving operation.

As noted hereinabove, the isolation barrier for the transceiver 108 is provided at the transformer 128. As such, any DC voltage or grounding problem on the receive side will not be reflected through to the transceiver, such that the transceiver on each side of the transmission line will have its own DC voltage and ground.

Figure 2:
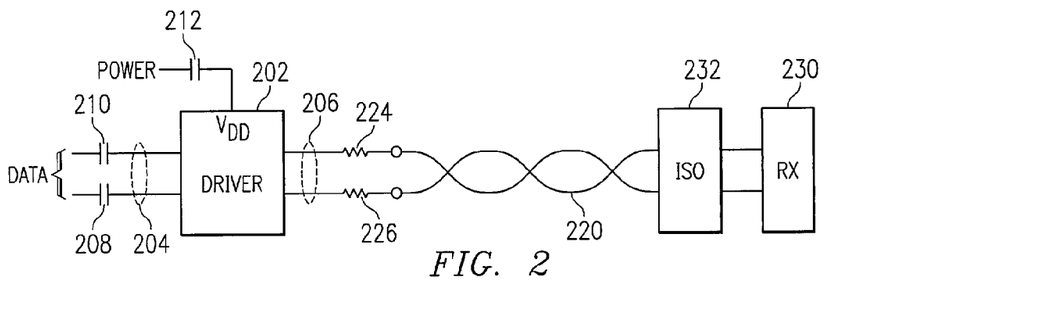
FIG. 2 illustrates a diagrammatic view of the driver for the transmit pair of a twisted wire pair.

Referring now to FIG. 2, there is illustrated a diagrammatic view of the isolation operation with respect to the transceiver, specifically the driver. There is provided a driver block 202 which is operable to receive data on input lines 204 to output differential data on output lines 206. The driver block 202 is configured such that it is isolated from the data via an AC coupling mechanism, and instantiated with capacitors 208 and 210 for the two lines, respectively. Additionally, the $V_{DD}$ power is isolated with a capacitor 212 from the overall power input. As will be described hereinbelow, this capacitor 212 basically represents a DC—DC switching power supply. As such, the driver 202 is effectively isolated from both the data side of the system and the power side of the system. In the embodiment of FIG. 2, the two lines 206 are connected directly to a twisted wire transmission line 220 with two series resistors 224 and 226, respectively, which have a resistance of approximately 47 ohms, the total impedance of each of the lines and the associated resistor 224 or 226 being approximately 50 ohms. This is basically the internal impedance of the transmission line 220.

At the opposite end of the transmission line will be disposed a receive block 230 which is isolated from the transmission line 220 with an isolation block 232. In this manner, the driver 202 is directly connected to the transmission wire 220, thus eliminating the isolation transformer. As such, the driver 202 will now be disposed about the DC level of transmission line 220. Note that the ground is also isolated.

Figure 3:
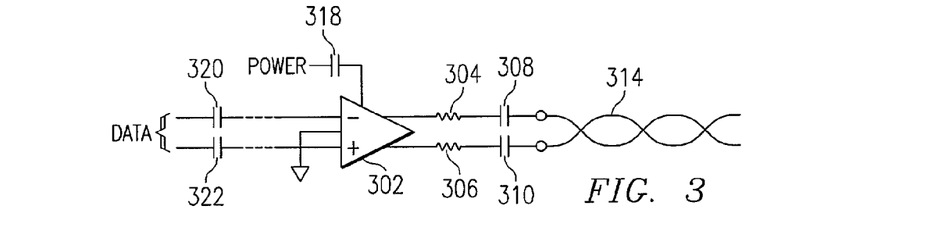
FIG. 3 illustrates an alternate embodiment of a differential line driver for the transmit side of a twisted wire pair.

Referring now to FIG. 3, there is illustrated a diagrammatic view of a driver wherein the output of the driver is isolated from the transmission line. A differential driver 302 is illustrated, which differential driver provides better common mode voltage operation. The output of the differential driver 302 is connected through two series resistors 304 and 306 through respective AC coupling capacitors 308 and 310 to the two wires of a transmission line pair 314. As such, the output of the driver 302 is isolated from the transmission line pair 314. The power input of the driver 302 is similarly isolated from the power supply with an isolation device 318. The data inputs are also isolated with capacitive coupling through capacitors 320 and 322. Since the output of the driver 302 is isolated, the receiver need not be isolated, but this isolation may be effected through the use of a transformer, or some similar isolation device. The disadvantage of the capacitive isolation is that very large capacitors are required with a higher speed operation, especially that associated with 1000BASE-T operation. This will be described in more detail hereinbelow.

Figure 4A:
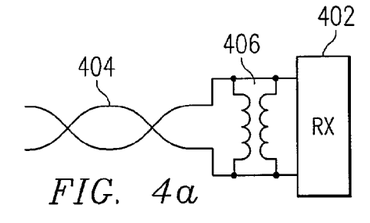
FIGS. 4a–4c illustrate embodiments for incorporating isolation into the receive side of a twisted wire pair.
Figure 4B:
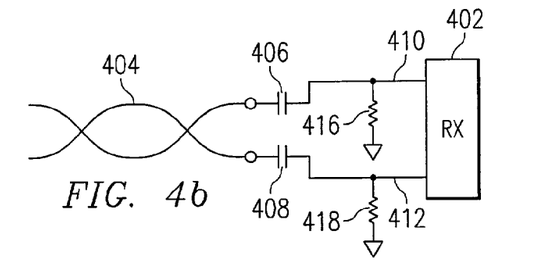
Figure 4C:
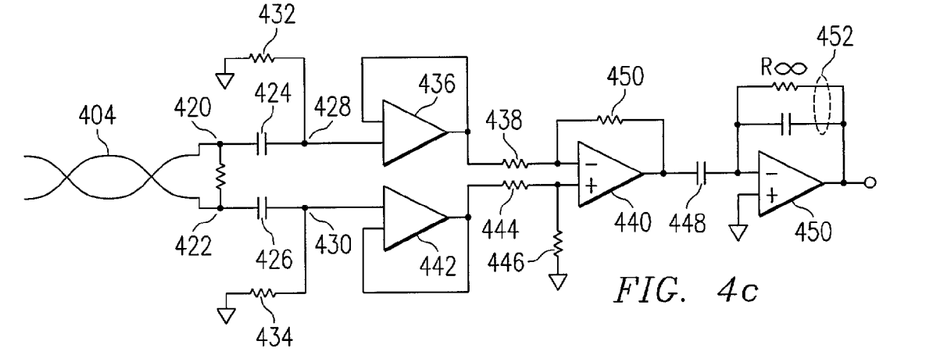

Referring now to FIGS. 4a–4c, there are illustrated three embodiments for the receive side isolation operation. In FIG. 4a, there is illustrated a receiver 402 that is interfaced with a transmission line pair 404. The receive side of the transmission line pair 404 is connected to two terminals on one side of a transformer 406, with the receiver 402 connected to two wires on the other side thereof. This is conventional transformer isolation. This will provide DC isolation and provide an isolation barrier.

FIG. 4b illustrates the receiver 402 wherein the transmission line pair 404 has the ends of the two wires thereof connected to one side of capacitors 406 and 408, respectively. The other side of the capacitors 406 and 408 are connected to nodes 410 and 412, respectively. The node 410 is connected to one side of a resistor 416, the other side thereof connected to ground. Similarly, node 412 is connected through a resistor 418 to ground. The resistors 416 and 418 provide the termination impedance to the transmission line whereas the capacitors 406 and 408 provide the isolation.

Referring now to FIG. 4c, there is illustrated a third embodiment of the receive operation. Each of the two wires in the pair 404 is connected to a respective node 420 and 422, node 420 connected to one side of the capacitor 424 and node 422 connected to one side of the capacitor 426. The other side of capacitor 424 is connected to a node 428 and the other side of capacitor 426 is connected to a node 430. Node 428 is connected to ground through a resistor 432 and node 432 is connected to ground through a resistor 434. Node 420 is connected to one input of a buffer 436, the other side thereof connected through a resistor 438 to the negative input of amplifier 440. Similarly, node 430 is connected to one input of a buffer 442, the output thereof connected through a resistor 444 to the positive input of amplifier 440. The positive input of amplifier 440 is connected to ground through a resistor 446, the negative input thereof connected to the output thereof through a resistor 450, amplifier 440 providing a double-ended to single-ended conversion.

The output of amplifier 440 provides a single output which is connected to one side of an isolation capacitor 448, the other side thereof connected to the negative input of an amplifier 450, the positive input thereof connected to ground. A resistor/capacitor feedback network 452, comprised of a resistor and capacitor connected in parallel, is connected between the negative input and the output.

Figure 5:
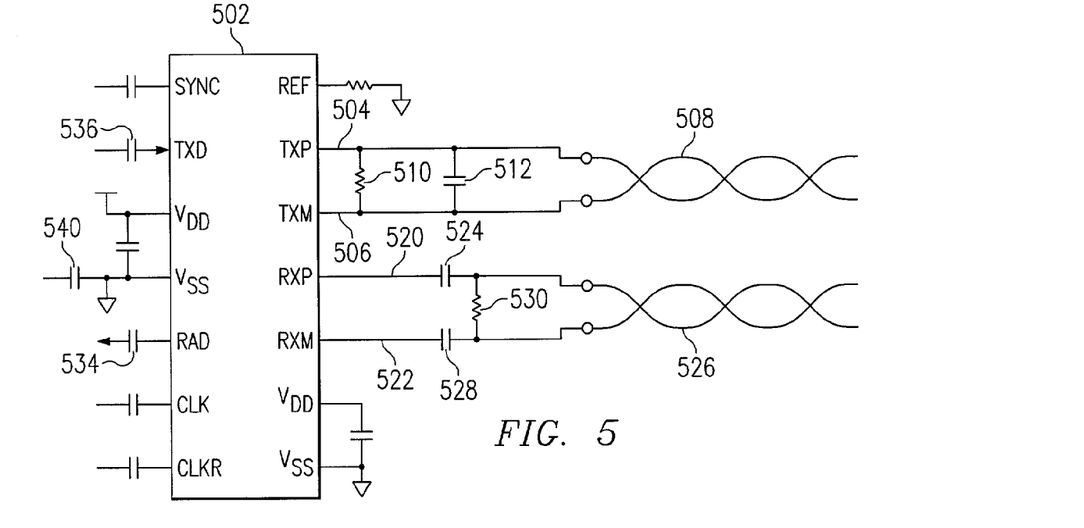
FIG. 5 illustrates a block diagram of an integrated circuit for a half duplex ethernet controller transceiver.

Referring now to FIG. 5, there is illustrated an embodiment illustrating an integrated circuit or chip 502 which houses the transceiver. This is for a 10/100BASE-T operation wherein one pair is associated with a transmit operation and one pair is associated with a receive operation, i.e., a half duplex operation. In this embodiment, there is provided a transmit positive terminal 504 and a transmit negative terminal 506. The terminals 504 and 506 are directly connected to respective lines on a transmission pair 508. A resistor 510 is connected between terminals 504 and 506 and a capacitor 512 is connected between terminals 504 and 506. The resistor 510 provides approximately 100 ohms of termination impedance. The receive side is provided with a positive receive terminal 520 and negative receive terminal 522. Positive terminal 520 is connected to one side of a capacitor 524, the other side thereof connected to one wire of a receive transmission line pair 526. The negative terminal 522 is connected through a capacitor 528 to the other wire of the pair 526. A resistor 530 is connected directly across the two wires in the transmission line pair 526. The receive data is capacitively coupled through the integrated circuit 502 such that it is output through a capacitor 534. Data transmitted to the transceiver 502 for output on the transmission line 508 is capacitively coupled to the integrated circuit 502 with a capacitor 536. The ground is capacitively coupled with a capacitor 540. Similarly, clock signals are also capacitively coupled and a Synch signal is capacitively coupled. As such, the input side to the chip 502 "floats" with respect to the data side. It is directly connected to the transmission line on both receive and transmit sides and, as such, is not isolated therefrom. This will require isolation on the receive side which is facilitated with the capacitors 524 and 528. Since the integrated circuit 502 is capacitively coupled on the data side, there may be required some customized input/output cells on the data side or the MAC that is interfaced with the transceiver 502.

Figure 6:
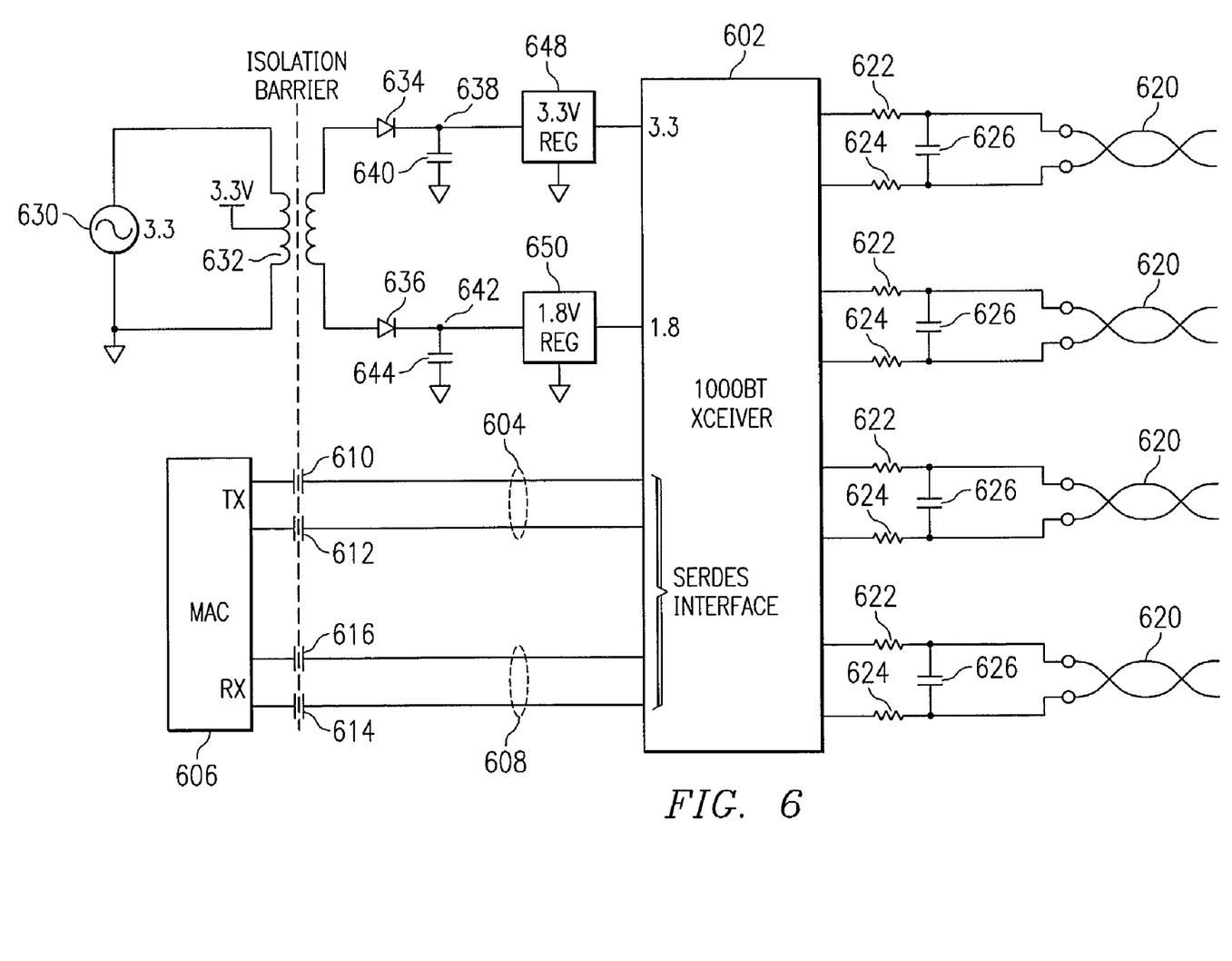
FIG. 6 illustrates a diagrammatic view of a 1000BASE-T transceiver utilizing all four ports in full duplex operation.

Referring now to FIG. 6, there is illustrated a diagrammatic view for the embodiment of a 1000BASE-T transceiver 602. The data side of the transceiver 602 interfaces through two transmit lines 604 to receive data from a MAC 606 and transmits data to the MAC 606 through two receive lines 608. This is a SERDES interface which requires this to be capacitively coupled. Therefore, the two transmit lines 604 interface with the MAC 606 with two capacitors 610 and 612, with the receive lines interfaced to the MAC 606 with two capacitors 614 and 616. There are provided four ports on the output for interfacing with four transmission line pairs 620 without DC isolation. Each of the transmission lines 620 is interfaced with its respective port through two series resistors 622 and 624, respectively with a capacitor 626 disposed across the transmission line pair 620. Each of the ports has a power requirement of approximately 0.25 watt. Each of the ports operates in a full duplex mode to transmit and receive data at the rate of approximately 250 Mbits/sec.

In addition to isolating the transceiver 602 from the data side, associated with the MAC 606, the power supply is also isolated. This facilitated with a DC—DC converter which is comprised of an oscillator 630 which operates at a 3.3 volt level that drives one side of the transformer 632. The transformer 632, on the other side thereof has two outputs, one of which drives the cathodes of the first diode 634 and the second diode 636. The anode of the first diode 634 is connected to a node 638, node 638 connected to one side of a capacitor 640, the other side thereof connected to ground. Similarly, the anode of capacitor 636 is connected to a node 642, node 642 connected to one side of a capacitor 644, the other side thereof connected to ground. The rectified voltage on node 638 is input to a 3.3 volt regulator circuit 648, the output thereof providing a 3.3 volt input to the transceiver 602. The rectified voltage on node 642 is input to a 1.8 volt regulator 650, the output thereof providing a 1.8 volt input to the transceiver 602. Therefore, it can be seen that both the data and the power supply are isolated from the transceiver or the line driver and the transmission lines 620.

Figure 7:
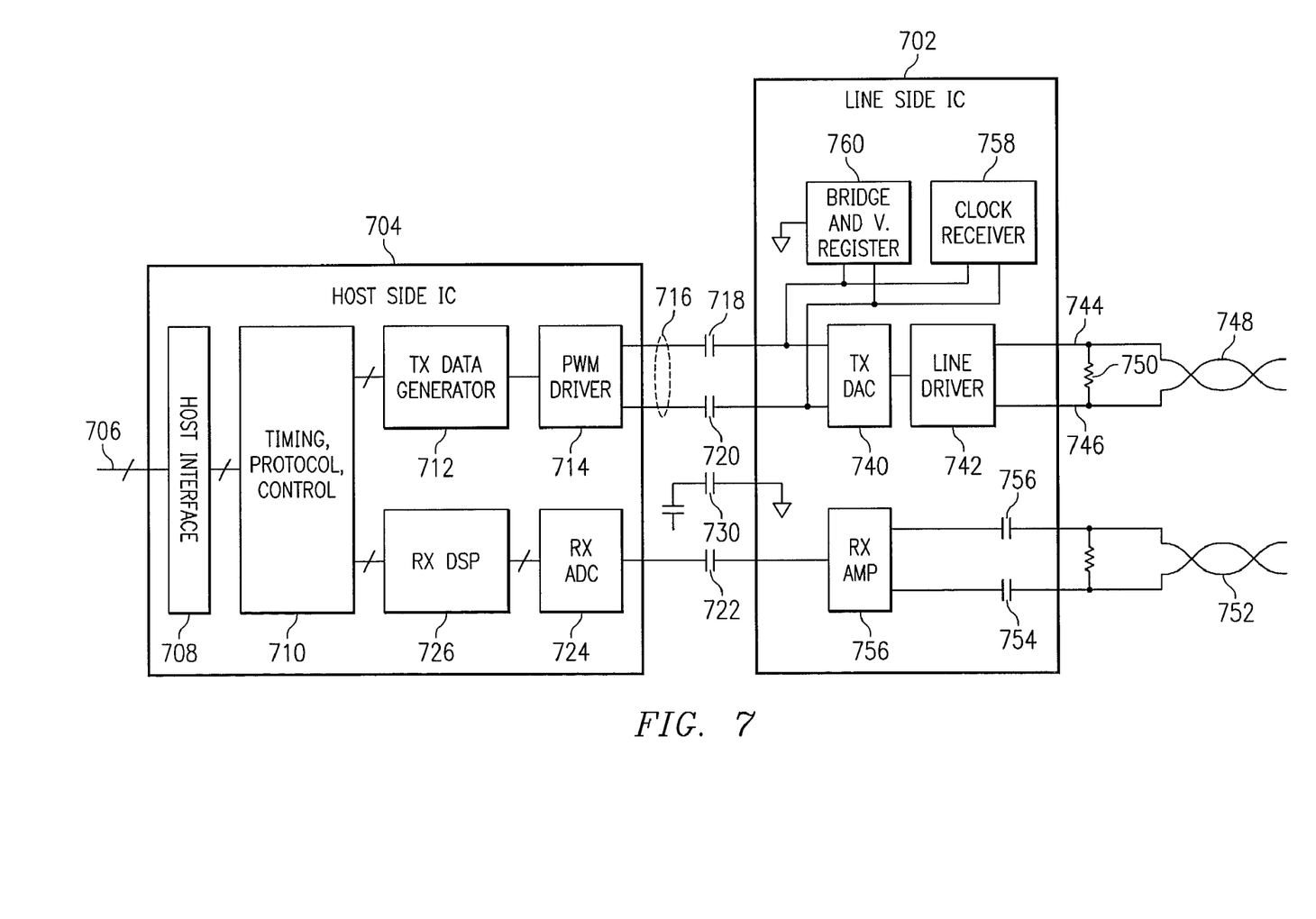
FIG. 7 illustrates a similar detailed diagrammatic view of the transceiver/host system.

Referring now to FIG. 7, there is illustrated a more detailed diagrammatic view of the configuration for a two chip solution. As illustrated, in this configuration, there is provided a line side integrated circuit 702 and host side integrated circuit this would address 10/100 BASE-T operations, wherein the lower power requirements allow capacitively coupled power. The IC 704 receives a single-ended input on a data input 706 which is input to a host interface 708, which is interfaced with transmit and receive paths through a timing, protocol and control block 710. The data is transmitted on the transmit path by interfacing with a transmit data generator block 712 which then conditions the data in the appropriate format and, in the instantiation illustrated, utilizes a pulse width modulation (PWM) driver 714 to provide a differential output. A single ended output could be provided, but a differential output is preferred with respect to common node noise. The output of the PWM driver 714 is comprised of two lines 716 which are connected to the line side IC driver 702 with two capacitors 718 and 720. The receive path is provided by receiving data from the line IC and coupling it through a capacitor 722 over to the host side IC to a receive analog-to-digital converter 724. This provides a digital output which is processed with a receive DSP 726 for input to the timing, protocol and control block 710. The ground on the line side IC 702 is capacitively coupled to ground through a capacitor 730.

The line IC 702 has a transmit digital-to-analog converter 740 which has a double-ended input for receiving the differential input on the other side of the capacitor 718 and 720. This provides an output signal to a differential line driver 742 which drives two output terminals 744 and 746. The terminals 744 and 746 are connected to a single two wire pair 748 in the transmission line, with a resistor 750 disposed thereacross. The receiver is capacitively coupled to a two wire pair 752 with two capacitors 754 and 756. The receive signal is input to a receive amplifier 756 which is a double-ended-single-ended amplifier for outputting a receive signal to one side of the capacitor 722 which is AC coupled therethrough over to the receive analog-to-digital converter 724.

The clock recovery block 758 is provided for recovering the clock from the transmit side, with power also recovered therefrom with a bridge and voltage regulator block 760. Therefore, both power, clock and data are transmitted in the transmit side from the host side to the line side, this being a unidirectional operation.

Figure 8:
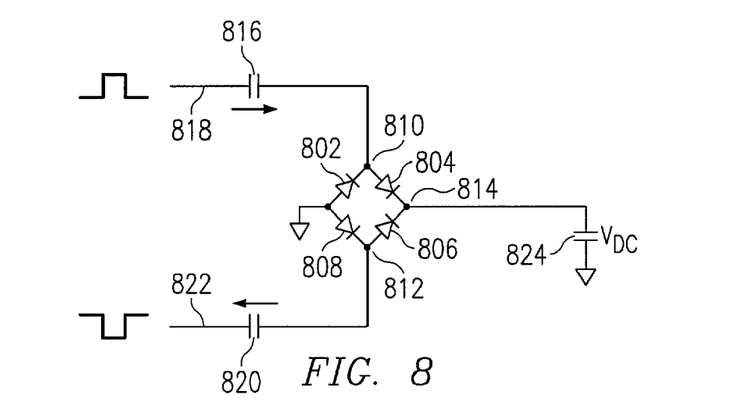
FIG. 8 illustrates one embodiment of a power delivery system.

Referring now to FIG. 8, there is illustrated a schematic diagram of a power bridge for delivering power. The power bridge is comprised of a full wave rectifier which comprises four diodes 802, 804, 806 and 808. Diodes 802 and 808 have the cathodes thereof connected to ground, with the anodes connected to nodes 810 and 812, respectively. Diodes 804 and 806 have the anodes thereof connected to an output node 814, with the cathode of diode 804 connected to node 810 and the cathode of diode 806 connected to node 812. Node 810 is connected to one side of a capacitor 816, the other side thereof connected to a node 818 to receive a positive going pulse. Node 812 is connected to one side of a capacitor 820, the other side thereof connected to a node 822 in order to receive a negative going pulse. The output node 814 is filtered with a capacitor 824. This is a conventional bridge rectifier, i.e., a passive bridge.

Figure 9:
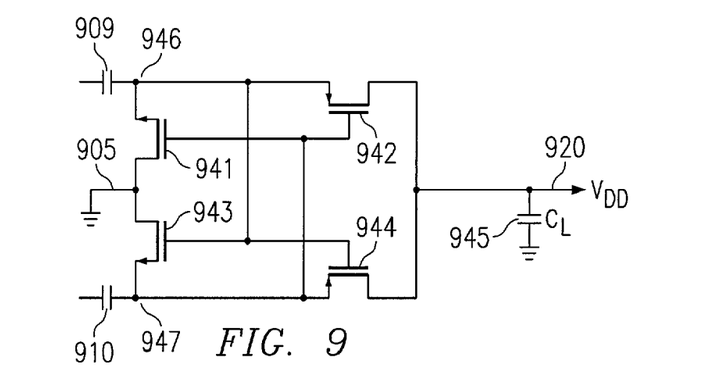
FIG. 9 illustrates a second embodiment of a power delivery system.

Referring now to FIG. 9, there is illustrated a schematic diagram of an active bridge. The active bridge is comprised of two n-channel transistors 943 and 941, the drains thereof connected to a ground node 950. The source of transistor 643 is connected to a node 947, the source of transistor 941 connected to a node 946. Node 947 is connected to one side of a capacitor 910, the other side thereof connected to receive a negative going pulse. Node 946 is connected to one side of a capacitor 909, the other side thereof connected to a positive going pulse. The gate of transistor 943 is connected to node 946 and the gate of transistor 941 is connected to node 947. The gate of transistor 943 is also connected to the gate of a p-channel transistor 944, the source/drain path thereof connected between an output voltage node 920 and the node 947. The second p-channel transistor 942 has the source/drain path thereof connected between node 946 and the node 920, with the gate thereof connected to node 947.

Figure 10:
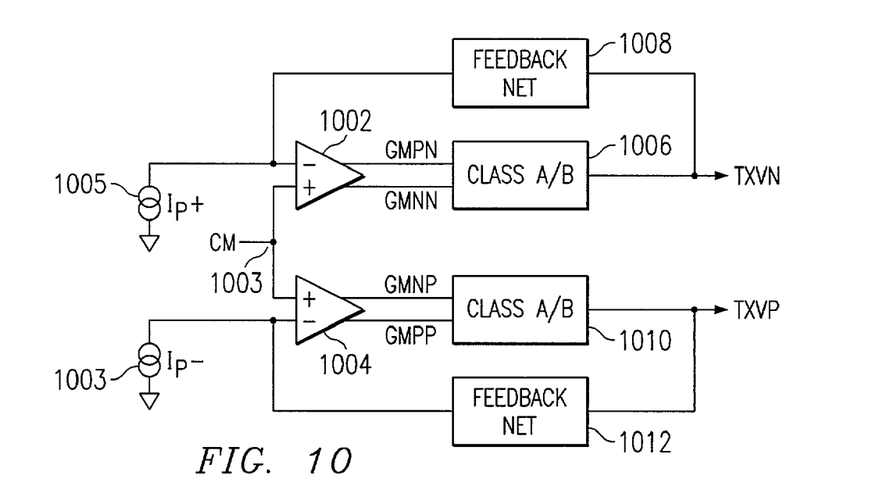
FIG. 10 illustrates a simplified diagram of the voltage driver of FIG. 3.

Referring now to FIG. 10, there is illustrated a more detailed schematic diagram of the voltage driver 302. A positive IDAC input from a DAC (not shown) is input to the negative input of a folded cascode amplifier 1002, the positive input thereto connected to a common mode voltage on a node 1003. A second folded cascode amplifier 702 is provided having the negative input thereof connected to a negative IDAC input from the DAC and the positive input thereto connected the node 1003 to the common mode voltage. The output of the amplifier 704 is comprised of a positive and a negative differential output gmpn and gmnn, respectively, which are input to a Class AB output stage 1006. The output therefrom is the txvn signal. The signal is fed back through a feedback network 1008 to the negative input of amplifier 1002. Similarly, the two outputs of the amplifier 1004 are the gmnp and gmpp outputs which are fed to a Class AB output stage 1010, the output of which provides the txvp signal. This is fed back through a feedback network 1012 to the negative input of amplifier 1004.

Figure 11:
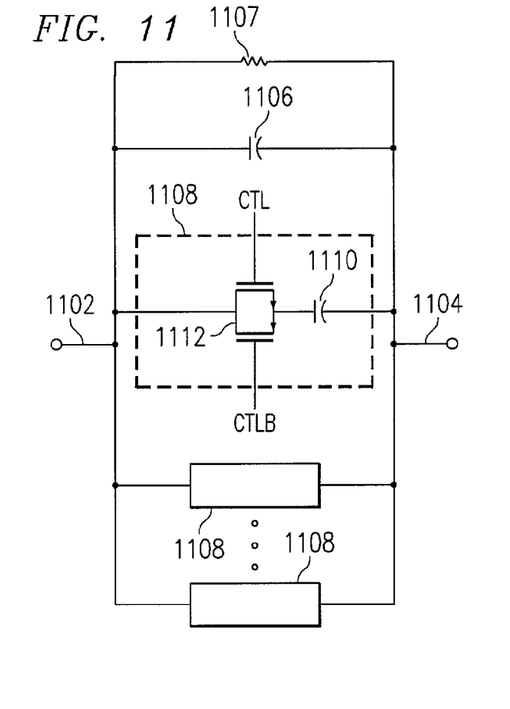
FIG. 11 illustrates a diagram of the feedback network for the embodiment of FIG. 10.

Referring now to FIG. 11, there is illustrated a diagrammatic view of the feedback network 1008 and the feedback network 1012. There is provided an input 1102 and an output 1104. Between the input 1102 and the output 1104 is provided a capacitor 1106 in parallel with a resistor 1107. This constitutes the base feedback capacitor 1106 and the feedback resistor 1107. Additionally, there are provided a plurality of selectable capacitive networks 1108. Each of these capacitor networks is comprised of a switchable capacitor 1110 which is connected in series with an N-channel/P-channel transmission gate 1112 between the input 1102 and the output 1104. Two control signals, CTL and CTLB are provided for rendering the transmission gate 1112 conductive or nonconductive. As such, each of the selectable capacitors 1108 can be connected in parallel with the capacitor 1106 to change the value thereof, this being an external control feature.

Figure 12:
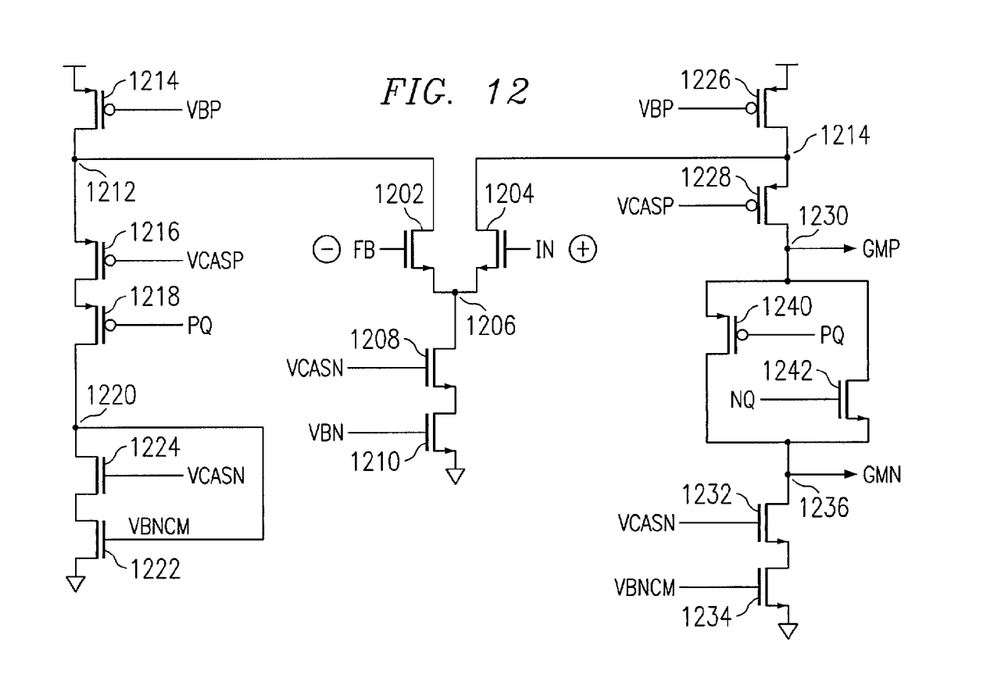
FIG. 12 illustrates a schematic diagram of the differential amplifier for the voltage driver of FIG. 10.

Referring now to FIG. 12, there is illustrated a schematic diagram of the differential amplifier 1002 and the differential amplifier 1004. The input is comprised of a differential pair of N-channel transistors 1202 and 1204 with a common source connecting to a node 1206. Node 1206 is connected through two series connected N-channel transistors 1208 and 1210 to ground, transistor 1208 having the gate thereof connected to a cascode bias voltage vcasn, and the transistor 1210 having the gate thereof connected to the current source bias voltage vbn. The differential input transistor 1202 has the gate thereof connected to the negative feedback signal fb, with the transistor 1204 having a gate thereof connected to the positive input signal or the common mode input on node 1003 illustrated in FIG. 10. The drain of transistor 1202 is connected to a node 1212 and the drain of transistor 1204 is connected to a node 1214.

The node 1212 is connected to one leg of the amplifier to provide a cascode operation. A P-channel transistor 1214 has the source/drain path thereof connected between $V_{dd}$ and node 1212, and the gate thereof connected to a current source bias voltage vbp. A cascode pair of P-channel transistors 1216 and 1218 are connected in series between node 1212 and a node 1220, the gate of transistor 1216 connected to a cascode bias voltage vcasp and the gate of transistor 1218 connected to a p-channel bias voltage pq (this is a Class AB Quiescent bias voltage). Node 1220 is connected to the lower side of the leg for the N-channel portion with two cascoded N-channel transistors 1222 and 1224 connected in series between node 1220 and ground. Transistor 1222, having the source thereof connected to ground, has the gate thereof connected to node 1220, with the gate of transistor 1224 connected to the cascode bias signal vcasn.

The node 1214 is connected to a second leg, the output leg, that is also a cascode leg. A P-channel transistor 1226 is connected between $V_{dd}$ and node 1214, with the gate thereof connected to a current source bias voltage vbp. A cascode P-channel transistor 1228 is connected between node 1214 and an output node 1230 to provide the gmp output signal. The lower portion of the output leg is comprised of two series connected N-channel transistors 1232 and 1234 between ground and a node 1236 representing a gmn output signal. The gate of transistor 1234 is connected to a bias voltage vbncm and the gate of transistor 1232 is connected to a cascode bias signal vcasn. Between nodes 1230 and 1236 are provided two parallel connected transistors, a P-channel transistor 1240 having the source/drain path thereof connected between nodes 1230 and 1236 and the gate thereof connected to bias signal pq (the Class AB Quiescent current control voltage). The N-channel transistor 1242 is connected between nodes 1230 and 1236 with the gate thereof connected to the n-channel bias signal nq (the Class AB Quiescent current control voltage).

Figure 13:
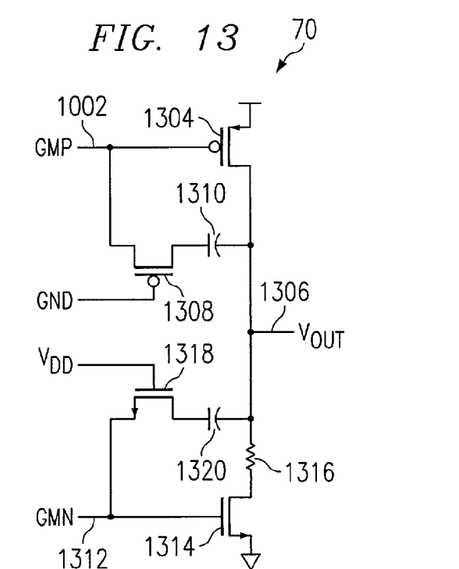
FIG. 13 illustrates a schematic diagram of the class AB output stage for the voltage driver of FIG. 10.

Referring now to FIG. 13, there is illustrated a schematic diagram of the Class AB stage 1310. The gmp signal is input on anode 1302 to the gate of a P-channel transistor 1304 having the source/drain path thereof connected between the $V_{dd}$ and the output node 1306. A P-channel transistor 1308 has the source/drain path thereof connected between node 1302 and through a capacitor 1310 to the output node 1306, and the gate thereof connected to ground. The gmn signal is connected to a node 1312 and to the gate of an N-channel transistor 1314. Transistor 1314 has the source/drain path thereof connected to ground and through a series ballast resistor 1316 to the output node 1306. An N-channel transistor 1318 has the source/drain path thereof connected between node 1312 and through a capacitor 1320 to node 1306. The gate of transistor 1318 is connected to the $V_{dd}$.

Although the preferred embodiment has been described in detail, it should be understood that various changes, substitutions and alterations can be made therein without departing from the spirit and scope of the invention as defined by the appended claims.

What is claimed is:

1. A method for isolating an ethernet controller, having a transceiver associated therewith, from a twisted wire transmission line, comprising:
   DC isolating the power supply of the transceiver from system power supply;
   DC isolating the data side of the transceiver from the data side of the ethernet controller for both transmit and receive data; and
   directly connecting the transceiver to the transmission line with no DC isolation.

2. A transceiver for an ethernet controller, the transceiver configured for data communication with a media access controller (MAC) and, over a transmission medium, a further transceiver remote from the transceiver, the transceiver comprising:
   a driver block operable to receive input differential data from the MAC on input differential lines and to output differential data on output differential lines, the driver block receiving power sourced from a power source;
   input isolation capacitors on the input differential lines to DC isolate the driver block from the MAC; and a power isolation capacitor to DC isolate the driver block from the power source, wherein the driver block is coupled to the transmission medium without DC isolation elements between the driver block and the transmission medium such that the driver block is at the DC level of the transmission medium.

3. An ethernet communication system comprising:

a transmitter configured to receive differential data from a data source, to receive power from a power source, and to transmit data over a transmission medium, the transmitter DC isolated from the data source, the transmitter DC isolated from the power source, and the transmitter coupled to the transmission medium without DC isolation; and a receiver remote from the transmitter, the receiver configured to receive data from the transmitter over the transmission medium, the receiver DC isolated from the transmission medium.

4. The ethernet communication system of claim 3 wherein at least one transformer DC isolates the receiver from the transmission medium.

5. The ethernet communication system of claim 3 wherein the transmission medium comprises a differential pair of wires, and the receiver is DC isolated from the transmission medium by a blocking capacitor across each of the pair of wires, the wires coupled by a resistor.

6. The ethernet communication system of claim 5 further comprising a pair of further resistors, each one of the further resistors coupling a corresponding one of the pair of wires to ground.

7. A communication system for performing transmit and receive operations of a transceiver included in an ethernet controller, the communication system comprising:

a line driver having an input side for receiving data and an output side for transmitting data;

a DC isolation circuitry connected to the line driver on the input side for DC isolating the input side of the line driver;

a power supply coupled to the line driver for supplying power to the line driver; and an isolation capacitor coupled between the power supply and the line driver for DC isolating the line driver from the power supply.

8. The communication system of claim 7, further comprising series resistors coupled to the line driver on the output side for coupling the line driver to a transmission medium without DC isolation, the line driver being disposed at substantially a DC level of the transmission medium.

9. The communication system of claim 7, wherein the line driver is a differential driver.

10. The communication system of claim 8, wherein the line driver is a differential driver.

11. The communication system of claim 7, further comprising:

a twisted wire transmission line coupled to the output side as the transmission medium;

an isolation block coupled to the twisted wire transmission line at a remote location, the remote location being connected to a location of the line driver through the transmission medium; and a receive block coupled to the isolation block at the remote location, wherein the receive block is DC isolated from the twisted wire transmission line by the isolation block.

12. The communication system of claim 11, wherein the isolation block is a transformer.

13. The communication system of claim 11, wherein the isolation block includes a first series RC circuit and a second series RC circuit each including a capacitor for providing DC isolation and a resistor for providing termination impedance to one line of the twisted wire transmission line.

14. The communication system of claim 11, wherein the isolation block includes:

a first series RC filter coupled to a first line of the twisted wire transmission line;

a second series RC filter coupled to a second line of the twisted wire transmission line;

a first buffer coupled to the first series RC filter;

a second buffer coupled to the second series RC filter;

a fist amplifier coupled to an output of the first buffer and an output of the second buffer, the first amplifier providing a double-ended to single-ended conversion;

an isolation capacitor coupled to a single-ended output of the first amplifier; and a second amplifier coupled between the isolation capacitor and the receiver block.

15. The communication system of claim 7, wherein the line driver is included in the transceiver, the communication system further comprising:

a transmit twisted wire transmission line coupled to the line driver on the output side;

a receive twisted wire transmission line coupled to a receiver input of a receiver included in the transceiver, the transmit twisted wire transmission line and the receive twisted wire transmission line together forming the transmission medium;

a first pair of isolation capacitors coupled between the receiver input and the receive twisted wire transmission line for DC isolating the transceiver from the receive twisted wire transmission line; and an output isolation capacitor coupled to a receiver output for DC isolating data being output from the receiver, wherein the DC isolation circuitry coupled to the line driver on the input side includes an input isolation capacitor coupled to an input terminal of the line driver.

16. The communication system of claim 15, wherein ground is capacitively coupled to the transceiver through ground isolation capacitors, wherein clock signals are provided to the transceiver through a capacitively coupled clock input terminal, and wherein a synchronization signal is provided to the transceiver through a capacitively coupled synchronization signal input terminal.

17. The communication system of claim 15, wherein the transceiver has a data side coupled to a local device, the local device adapted for providing data to the data driver and receiving data from the receiver, wherein the transceiver has a line side coupled to the transmission medium, and wherein the data side of the transceiver floats with respect to the local device.

18. The communication system of claim 17, wherein the transceiver is implemented in an integrated circuit chip, and wherein the local device is a medium access controller.

19. The communication system of claim 7, wherein the line driver is included in the transceiver, the communication system further comprising:

first and second transmit twisted wire transmission lines, each including a pair of wires coupled together through a capacitor, each member of the pair coupled to the transceiver through a series resistor without DC isolation;

first and second receive twisted wire transmission lines, each including a pair of wires coupled together through a capacitor, each member of the pair coupled to the transceiver through a series resistor without DC isolation;

a medium access controller device coupled to the transceiver through a pair of transmit lines for conveying data from the transceiver to the medium access controller and a pair of receive lines for conveying data from the medium access controller to the transceiver;

a pair of output isolation capacitors for interfacing the pair of transmit lines with the medium access controller; and a pair of input isolation capacitors for interfacing the pair of receive lines with the medium access controller, wherein the first and second transmit twisted wire transmission lines and the first and second receive twisted wire transmission lines together form the transmission medium.

20. The communication system of claim 19, further comprising:

a power supply providing power to the transceiver;

a transformer coupled between the power supply and the transceiver for DC isolating the transceiver from the power supply; and a pair of rectifying diodes for providing a DC power to the transceiver.

\* \* \* \* \*